J. M. C. JONES.
CORN FORWARDING DEVICE FOR GREEN CORN CUTTING MACHINES.
APPLICATION FILED AUG. 1, 1912.
1,090,988.
Patented Mar. 24, 1914.
5 SHEETS—SHEET 5.
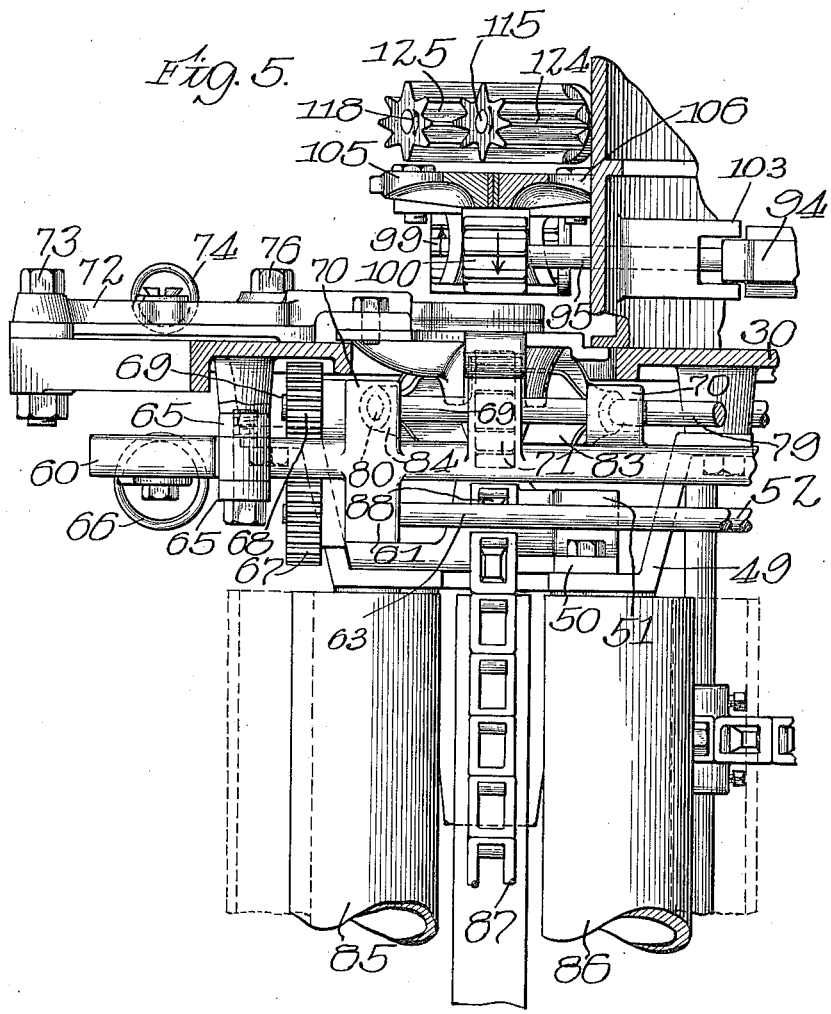

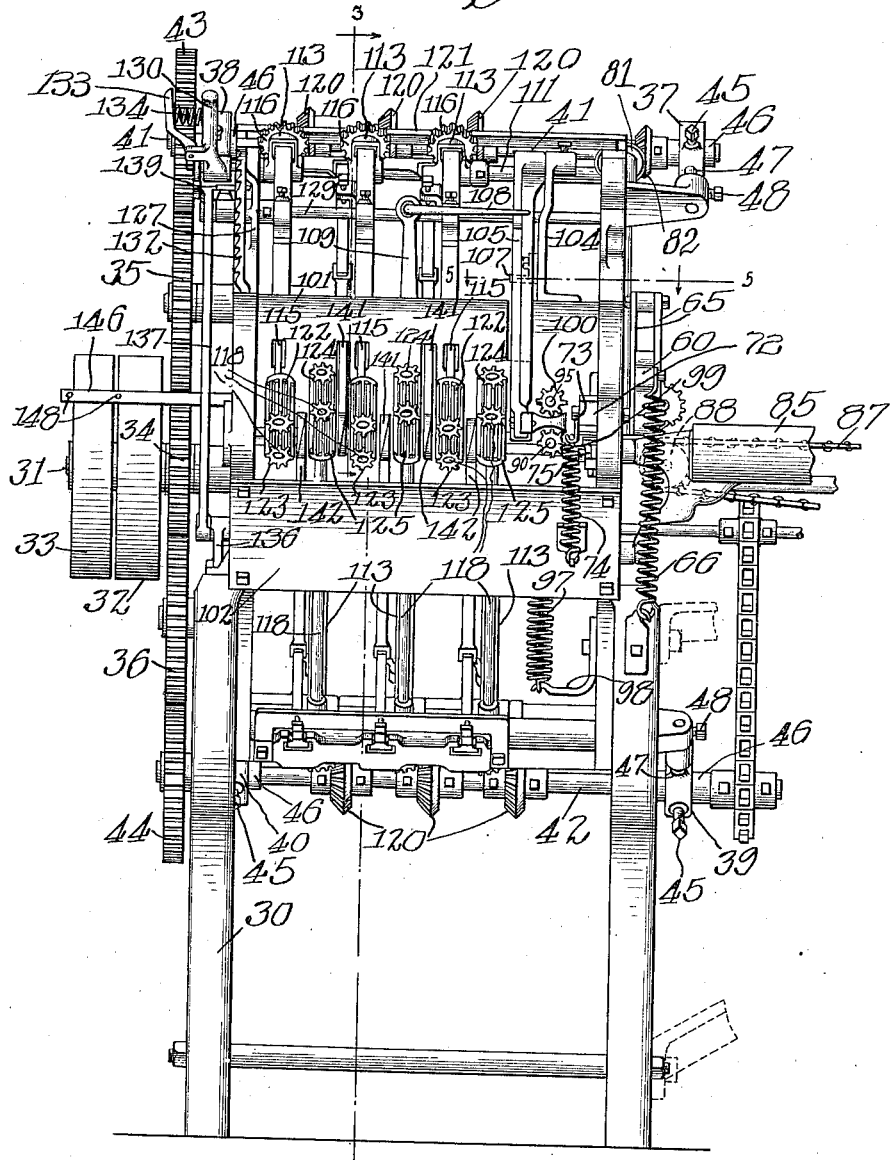

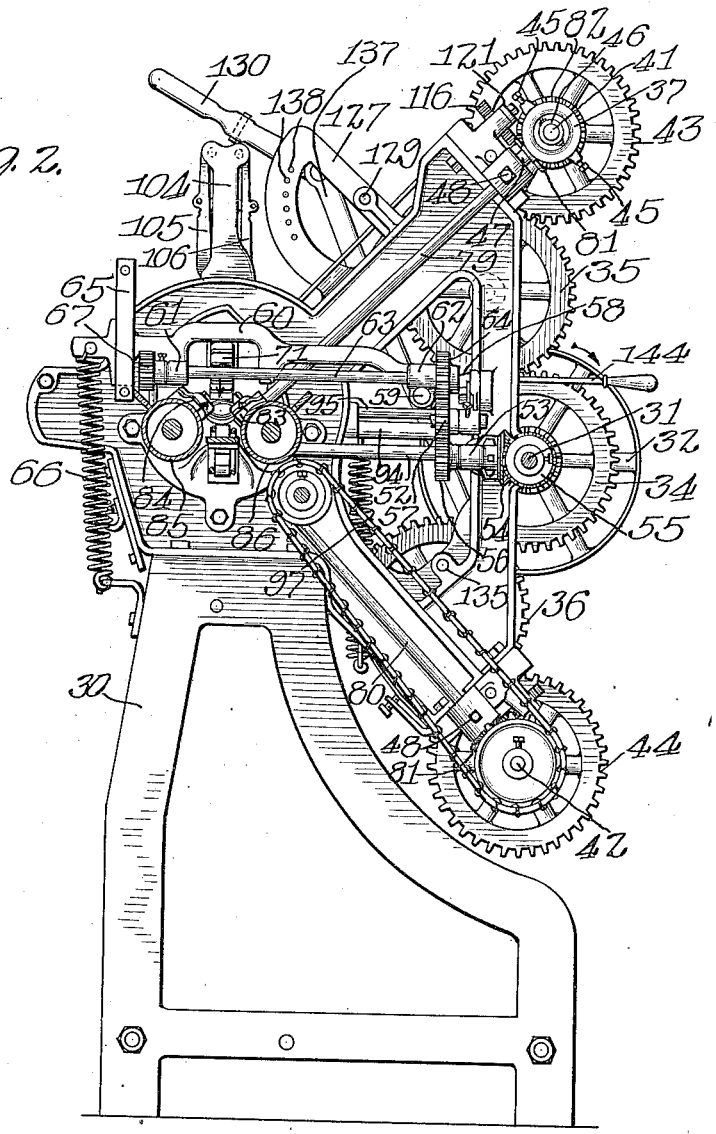

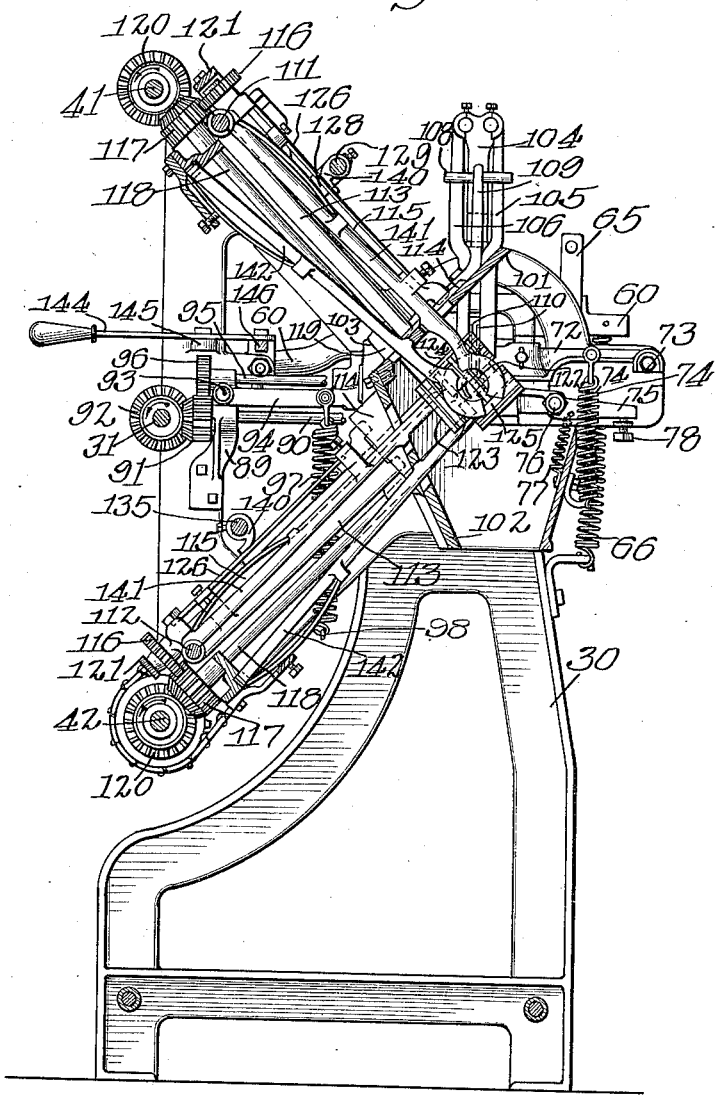

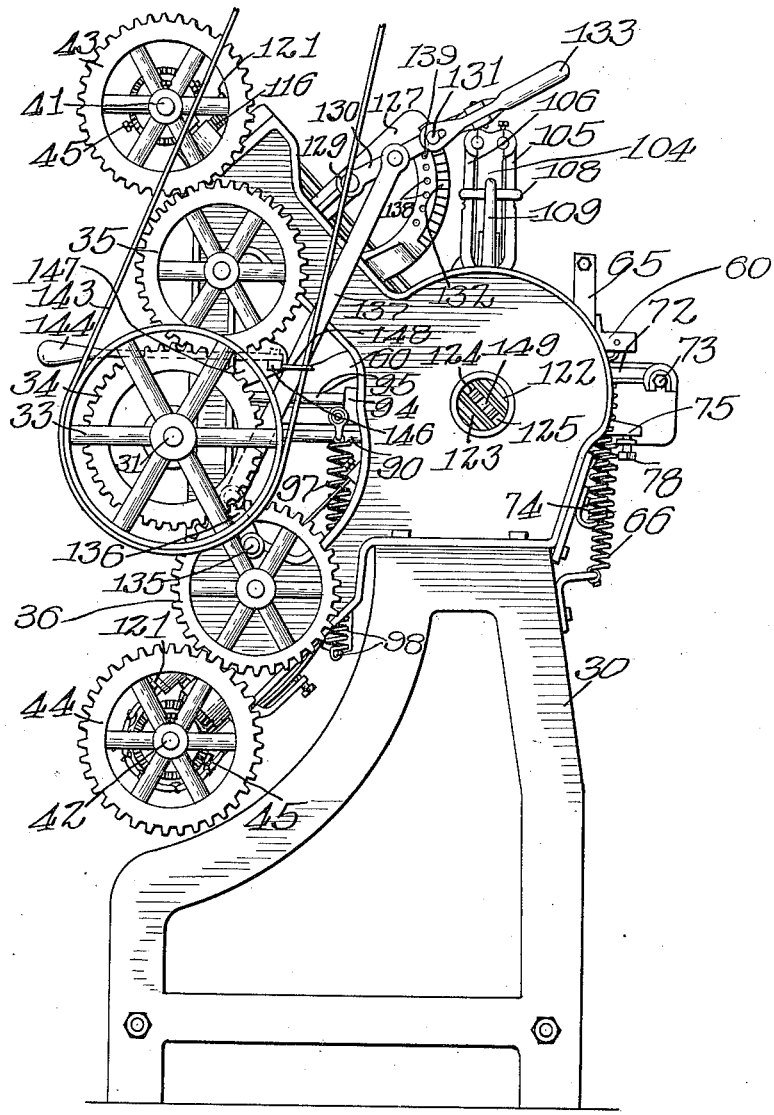

UNITED STATES PATENT OFFICE.

JOHN M. C. JONES, OF ONARGA, ILLINOIS.

CORN-FORWARDING DEVICE FOR GREEN-CORN-CUTTING MACHINES.

1,090,988. Specification of Letters Patent. Patented Mar. 24, 1914.

Original application filed February 27, 1911, Serial No. 611,065. Divided and this application filed August 1, 1912. Serial No. 712,641.

*To all whom it may concern:*

Be it known that I, JOHN M. C. JONES, a citizen of the United States, residing at Onarga, in the county of Iroquois, State of Illinois, formerly of Gibson City, county of Ford, State of Illinois, have invented certain new and useful Improvements in Corn-Forwarding Devices for Green-Corn-Cutting Machines, of which the following is a specification, reference being had to the accompanying drawings.

My invention relates to corn forwarding devices for green corn cutting machines, and has for its object to provide a new and improved arrangement of parts by which the corn is fed through the machine whereby the machine is more readily adaptable to different-sized ears of corn, whereby the cobs are less likely to be deflected out of their normal course, and whereby means is provided for loosening the grasp of the ear forwarding rollers upon an ear in case for any reason it is desired to withdraw it after it has been started on its course through the machine.

Another object is the improvement of machines of this class in sundry details hereinafter pointed out.

The means by which I have accomplished these objects are illustrated in the accompanying drawing and hereinafter specifically described.

That which I believe to be new is set forth in the claims.

The subject matter shown and described in this application originally formed a part of my application for improvements in green corn cutting machines, Serial No. 611,065, filed February 27, 1911, of which original application this application is a division.

In the drawings:—Figure 1 is a front elevation of the part of a complete green corn cutting machine forming the subject matter of this application; Fig. 2 is an end view of the parts shown in Fig. 1, seen from the right in said figure; Fig. 3 is a section taken on line 3—3 of Fig. 1; Fig. 4 is an end view of the machine seen from the left in Fig. 1; and Fig. 5 is substantially a section taken on line 5—5 of Fig. 1.

Referring to the several figures of the drawings, in which corresponding parts are indicated by like reference characters, 30 indicates the frame of the machine in which is suitably journaled a drive-shaft 31, provided with a pulley 32, loosely mounted thereon, and a pulley 33 keyed or otherwise non-rotatably secured thereon.

34 indicates a gear non-rotatably mounted on the shaft 31, meshing with which are two gears 35—36 journaled on the frame-work 30.

37—38—39—40 indicate bearing rings supporting shafts 41—42. Keyed or otherwise non-rotatably secured, upon the shafts 41—42 are gears 43—44, respectively, meshing with gears 35 and 36. Each of the bearing rings 37—38—39—40 is provided with two oppositely-disposed set-screws 45, which at their inner ends engage sleeves 46 in which the shafts are journaled, the shafts thus being capable of a slight adjustment in position. The bearing rings are mounted on the frame by means of studs 47 projecting therefrom, each of said studs being adjustable longitudinally of itself in a suitable socket upon the frame-work of the machine and being held in adjusted position by means of a set-screw 48.

Referring to Fig. 5, 49 indicates a bracket bolted or otherwise suitably secured to the frame-work 30. 50 indicates an arm suitably secured to the bracket 49, having a sleeve 51 at its lower end in which is journaled the front end of a shaft 52, the other end of which (see Fig. 2) is journaled in a sleeve 53 suitably secured to the frame-work 30. Said shaft is provided at its rear end with a bevel gear 54 which meshes with the bevel gear 55 mounted on the drive-shaft 31. 56 indicates a gear mounted on said shaft 52, meshing with which is an idler gear 57. 58 indicates a bracket projecting from the frame-work 30 carrying at its front end a pin 59 upon which is journaled a shaft-box 60, in bearings 61—62 of which is journaled a shaft 63. 64 indicates a gear fixed upon the rear end of the shaft 63 and meshing with the idler gear 57. 65 indicates two bars spaced apart and secured to the frame 30, between which the box 60 is adapted to bear in its swinging upon the pin 59. 66 indicates a coiled spring secured to the forward end of said box and to the frame-work, tending to hold said box yieldingly against swinging upon said pin 59. The forward end of the shaft 63 has keyed or otherwise non-rotatably secured upon it a gear 67, meshing with which is another gear 68, (see Fig. 5) keyed or otherwise non-rotatably mounted on a short shaft 69 journaled in arms 70 on the box 60 parallel with the shaft 63. Keyed or otherwise non-rotatably secured upon the shaft 69 is a spur-wheel 71 located directly opposite and a very short distance higher than the end of the feeding chain hereinafter referred to.

Referring especially to Fig. 3, 72 indicates an arm pivotally mounted at its front end upon a pin 73 and held yieldingly down by a spring 74. 75 indicates an arm pivotally mounted upon the pin 76 and held yieldingly upward at its rear end by a spring 77, the movement of the arm 75 in this direction being limited by the set-screw 78. These arms 72—75 are provided with cutting blades of any suitable type for stripping the kernels from an ear of corn fed thereto as hereinafter described. 79—80 indicate shafts (see Fig. 2) suitably journaled in the frame 30 and converging toward their forward ends. These shafts 79—80 are provided at their rear ends (see Fig. 1) with bevel gears 81 meshing with bevel gears 82 mounted upon the shafts 41—42. 83—84 indicate spur-wheels (see Fig. 2) mounted upon the shafts 79—80, respectively, below and at either side of the spur-wheel 71.

Referring to Fig. 5, 85—86 indicate rollers journaled at one end upon the bracket 49 adapted for alining the ears of corn, when fed in bulk to the machine, upon the chain 87, which is revolved between said two rollers by means of a gear 88 mounted upon the front end of the shaft 52. Inasmuch as these rollers 85—86 and the conveyer 87 form no part of my present invention and are fully described in my above-mentioned application, Serial No. 611,065, it is believed it is not necessary to further describe their construction or operation herein. 89 indicates a bracket secured to the frame-work adjacent to the drive shaft 31 (see Fig. 3), in a sleeve in the upper end of which is journaled a shaft 90, upon the rear end of which is mounted a combination spur and bevel gear 91, meshing with a bevel gear 92 mounted on the drive-shaft 31. 93 indicates a spindle secured in any appropriate manner to the frame-work 30, upon which is pivotally mounted a shaft-box 94, in which a shaft 95 is suitably journaled directly above the shaft 90. 96 indicates a spur-gear keyed or otherwise non-rotatably mounted on the shaft 95 and meshing with the gear 91 on the shaft 90. 97 indicates a coiled spring connected at its upper end to the pivoted box 94 and at its lower end to a bracket 98, carried by the frame 30, said spring tending to hold said box yieldingly against swinging upward. 99—100 indicate spur-wheels (see Figs. 1 and 5) mounted, respectively, on the forward ends of the shafts 90—95.

101—102 (see Fig. 3) indicate two cross-plates extending from one of the standards of the frame 30 to the other, through suitable openings in which plates the shafts 90—95 project. 103 indicates a guide carried by said plates 101—102 (see Figs. 3 and 5), between opposing parts of which the forward end of the box 94 is movable. As best shown in Fig. 5, the spurs 99—100 are directly in line with the knife blades carried by the arms 72—75 and positioned a very short distance from them. 104 indicates a bracket mounted on the plate 101, pivotally mounted on the upper end of which are two arms 105—106 spaced apart by a block 107 (see Fig. 1) carried by said bracket 104 and held yieldingly against swinging outward from said block by a U-shaped spring 108 carried at the upper end of a bracket 109. The arms 105—106 carry at their lower ends knives 110, substantially in vertical position, between which the ears of corn are forced, as hereinafter described. 111—112 indicate cross-rods extending from one of the standards of the frame to the other adjacent to the shafts 41—42, respectively. 113 indicates diagonally-extending shaft-boxes (see Figs. 1 and 3), pivotally mounted on said rods and adapted to swing about the same, and bearing at their forward ends against ribs 114 on the cross-plates 101—102. 115 indicates shafts journaled in said boxes 113, upon the rear ends of which shafts are mounted gears 116 meshing with combination spur and bevel gears 117 mounted on the rear ends of shafts 118 directly under and parallel with the shafts 115, said shafts 118 being suitably journaled in the framework 30 at their rear ends, and at their forward ends being journaled in studs 119 carried by the plates 101—102. 120 indicates bevel gears mounted on the shafts 41 and 42 meshing with the gears 117. 121 indicates cross-bars suitably secured at each end to the frame-work 30 and extending along the rear ends of the shafts 115. 122—123 indicate spur-rollers, keyed or otherwise non-rotatably mounted on the forward ends, respectively, of the parallel shafts 115—118, that are driven from the shaft 41, and 124—125 indicate spur-rollers keyed or otherwise non-rotatably mounted on the forward ends, respectively, of the parallel shafts 115—118 that are driven from the shaft 42. As shown in Fig. 4, the spur-rollers 122—123 are positioned opposite and substantially at right angles to the spur-rollers 124—125, and from Figs. 1 and 3 it can be seen that they are located directly in line with the spurs 99—100 and the knife blades hereinbefore referred to. 126 indicates flat springs (see Fig. 3) bearing at their ends upon the shaft-boxes 113. 127 indicates a bracket rising from the frame-work 30, as best shown in Fig. 2, journaled in which, and in bracket 128, is a rock-shaft 129 extending across from one to the other of the standards of the frame 30. 130 indicates a lever keyed or otherwise non-rotatably mounted on the rock-shaft 129. 131 indicates a pin slidably mounted in the lever 130, adapted to engage at one end a circular rack 132 carried by said bracket 127. 133 indicates a releasing latch pivotally mounted on said lever, the lower end of which latch engages the pin 131 so that by the movement of the upper end of the latch toward the lever the pin 131 is released from the rack 132. 134 indicates a spring tending to hold said latch away from said lever. 135 indicates a rock-shaft suitably journaled in the frame-work 30 and extending from one to the other of the standards of said framework. 136 indicates a short arm (see Fig. 4) keyed or otherwise non-rotatably mounted on said rock-shaft 135. 137 indicates a link pivotally connected at its upper end with said lever 130 and pivotally connected at its lower end with the upper end of said arm 136. It will thus be seen that by the movement of the lever 130 the rock-shafts 129 and 135 are simultaneously rocked. 138 indicates a series of holes in the rack-bar 132, in any one of which a pin 139 is adapted to be inserted for limiting the movement of the lever 130, as will be readily understood. 140 indicates cams (see Fig. 3) mounted on the rock-shafts 129 and 135, one of which cams is adapted to bear on each of the springs 126. The shape of the cams and the position of the rock-shafts 129 and 135 relative to the springs 126 are such that, when the rock-shafts are in position with the lever 130 swung in its uppermost position, the springs 126 are not compressed, but that the compression of the springs 126 by the cams 140 increases as the lever 130 is swung downward.

Adjacent to each pair of spur-rollers 122—123 and 124—125 are mounted a pair of scrapers 141—142. A shown in Fig. 3, the forward ends of the scrapers are positioned substantially in line with each other and substantially in line with the spur-rollers and knife blades hereinabove described. Inasmuch as these scrapers form no part of my present invention, it is not believed to be necessary to further describe them here. 143 indicates a driving belt (see Fig. 4) adapted to run on the pulleys 32—33 and driven from any suitable source of power. 144 indicates a lever pivotally mounted on a lug 145 carried by the framework 30. 146 indicates a bar pivotally connected at one end to the forward end of said lever 144, and supported at its other end by a lug 147 carried by the framework. 148 indicates pins carried by said bar 146 on either side of said belt 143. It will readily be understood that by the manipulation of the lever 144 the belt 143 may be shifted at will from one to the other of the pulleys 32—33. With the driving belt 143 running upon the pulley 33 in the direction indicated by the arrow next to the pulley in Fig. 2, the spur wheels 71, 83 and 84 will be rotating very rapidly in the directions indicated by the arrows on those spur wheels in Fig. 2, the machine being designed to have the shaft 31 running at about three hundred revolutions per minute. The set-screw 78 being regulated to suit the average size of the ears of corn to be treated, one end of an ear of green corn is presented to the spur wheels and is drawn quickly between them. The spur wheel 71 is free to give upward the requisite amount against the action of the spring 66, owing to its being mounted in the pivoted shaft-box 60. As the leading end of the cob leaves the blades carried by the arms 72—75, it comes into contact with the spur wheels 99—100, which are being rotated in the directions indicated by the arrows in Fig. 5, the wheel 100 being free to rise against the action of the spring 97. As the leading end of the cob leaves the spur wheels 99—100, it immediately engages the blades carried by the arms 105—106 which strip from the cob practically all the remaining corn, said blades being free to give sidewise against the force of the spring 108 but being kept substantially centered by the block 107. The cob is then caught by the first pair of spur rollers 124—125, which are rotating in the direction indicated thereon in Fig. 5, the lower roller being held stationary but the upper roller being free to give upward, as will be readily understood, against the action of the spring 126. As the leading end of the cob leaves the first pair of scrapers 141—142 between which it has been forced by the spur wheels 124—125, it is caught by the next succeeding pair of spur rollerss 122—123 set at substantially right angles to the positions of the spur rollers and scrapers between which it has just passed. Each succeeding pair of spur rollers and scrapers act precisely as do the first set. By reason of the rollers being set at an angle to each other, each pair of rollers corrects any slight departure from exact central alinement which the cob may have been permitted to assume by the preceding pair. Furthermore, by reason of having the roller shafts set at an angle and driven from two independent shafts instead of by a single shaft, I am enabled to place the rollers very much closer together in the line of progress of the cob. The result is that the cob is controlled much more positively in its progress, and a much shorter cob can be run through the machine without danger of its being deflected from the proper path than has ever heretofore been successfully sent through a machine of this class. Moreover, there is another feature of the construction of my machine which assists to this same end,—namely, the fixing of the lower spur rollers in permanent fixed position, the upper spur roller only being free to give to suit the size of the cob. This has a distinct tendency to keep the path of the cob through the machine in an exact straight line and prevents the cob being forced through in a zigzag fashion.

As the corn and juice are cut and scraped from the cob, they drop down into any suitable receptacle (not shown), or any suitable means may be provided for carrying the corn away from the machine. The cobs, after being scraped by the successive pairs of scrapers, are delivered through the opening 149 (see Fig. 4) and out of the machine.

In case a cob should be deflected from the normal path through the machine and become jammed between the spur rollers or the scrapers, a movement of the lever 130 to its uppermost position loosens the springs 126, making it comparatively easy to remove the cob from between the parts. After the springs 126 have been properly regulated by the movement of the lever 130,—and before such lever has been moved upward to loosen the springs as just described,—the pin 139 is designed to be placed in the opening 138 corresponding to the position of the lever, so that when it is desired again to tighten the springs 126 after the lever has been moved upward it is only necessary to pull the lever down into contact with the pin 139, when the springs will be again tightened to the same tension as that before the lever was moved upward to loosen the springs.

What I claim as my invention and desire to secure by Letters Patent is,—

1. The combination of a frame, two pairs of spur rollers arranged in said frame a short distance apart, the rollers of each pair being substantially parallel to each other and each roller being substantially opposite to and parallel to the corresponding roller of the other pair, a third pair of spur rollers arranged substantially parallel to each other and arranged between and substantially perpendicular to said first-mentioned pairs of rollers, and means for rotating said rollers whereby they are adapted to grasp and draw an ear of corn between them.

2. The combination of a frame, a pair of spur rollers arranged substantially parallel to each other in said frame, a second pair of spur rollers arranged opposite to and at an angle to said first-mentioned pair of spur rollers, one of the rollers of each of said pairs being movable toward and from the other roller of said pair on a line substantially at right angles to the axis of rotation of said roller, and means for rotating said rollers whereby they are adapted to grasp and draw an ear of corn between them.

3. The combination of a frame, a pair of spur rollers arranged substantially parallel to each other in said frame, a second pair of spur rollers arranged opposite to and at an angle to said first-mentioned pair of spur rollers, the lower roller of each pair being held rotatably in fixed position and each of the upper rollers being adapted to move upward relative to its lower roller, means for rotating the upper rollers in one direction, and means for rotating the lower rollers in the opposite direction.

4. The combination of a frame, a plurality of pairs of spur rollers each arranged in said frame a short distance from the adjacent pair, one roller of each pair being above the other, each roller being opposite to and parallel with the corresponding rollers of the other pairs, a plurality of pairs of spur rollers arranged at an angle to said first-mentioned rollers, one pair of which are positioned between each adjacent two pairs of the first-mentioned rollers, each of said second-named rollers being opposite to and parallel with the corresponding rollers of the other pairs of said second-named rollers, means for rotating the upper rollers in one direction, means for rotating the lower rollers in the opposite direction, said lower rollers being held rotatively in fixed position, each of said upper rollers being adapted to move upward relative to its lower roller, and yielding means tending to hold said upper rollers against moving upward.

5. The combination of two diagonally-disposed spur wheels rotatably mounted with their lower ends directly opposite each other and with their adjacent edges only a short distance apart, a third spur wheel rotatably mounted on a horizontal axis with its lower edge a short distance above the adjacent edges of said first-mentioned spur wheels, and means for rotating said spur wheels whereby they are adapted to grasp and draw between them an ear of corn.

6. The combination of two diagonally-disposed spur wheels rotatably mounted in fixed position with their lower ends directly opposite each other and with their adjacent edges only a short distance apart, a third spur wheel rotatably mounted on a horizontal axis with its lower edge a short distance above the adjacent edges of said first-mentioned spur wheels, said third spur wheel being adapted to move upward relative to said first-mentioned spur wheels, yielding means tending to prevent the upward movement of said third spur-wheel, and means for rotating said spur wheels whereby they are adapted to grasp and draw between them an ear of corn.

7. The combination of a plurality of pairs of spur rollers, means for rotating said spur rollers so that they are adapted to draw an ear of corn between them, one of the rollers of each pair being held in fixed position and the other roller being free to move away from the fixed roller, springs tending when stressed to hold said movable rollers yieldingly against movement away from the fixed rollers, and a lever by the movement of which said springs may be stressed.

8. The combination of a plurality of pairs of spur rollers, means for rotating said rollers so that they are adapted to draw an ear of corn between them, one of the rollers of each pair being held in fixed position and the other roller being free to move away from the fixed roller, springs tending when stressed to hold said movable rollers yieldingly against movement away from the fixed rollers, a rock-shaft mounted near said springs, cams on said rock-shaft adapted to be turned into contact with said springs to stress the same, and a lever by the movement of which said rock-shaft is rocked.

9. The combination of a plurality of pairs of spur rollers, means for rotating said rollers so that they are adapted to draw an ear of corn between them, one of the rollers of each pair being held in fixed position and the other roller being free to move away from the fixed roller, springs tending when stressed to hold said movable rollers yieldingly against movement away from the fixed rollers, a rock-shaft mounted near said springs, cams on said rock-shaft adapted to be turned into contact with said springs to stress the same, a lever by the movement of which said rock-shaft is rocked, and adjustable means limiting the movement of said lever to stress said springs.

10. In combination, a frame, a transverse shaft journaled therein, a pair of shafts arranged substantially parallel to each other driven from said transverse shaft in opposite directions, another transverse shaft journaled in said frame, a second pair of shafts arranged substantially parallel to each other at substantially a right angle to said first-mentioned pair of shafts, said last mentioned shafts being driven in opposite directions from said second transverse shaft, and spur rollers mounted on said pairs of shafts at their point of convergence.

11. In combination, a frame, a transverse shaft journaled therein, a series of pairs of shafts, the shafts of each pair being arranged substantially parallel to each other and being driven from said transverse shaft in opposite directions, a second transverse shaft journaled in said frame, a second series of pairs of shafts, the shafts of each pair being arranged substantially parallel to each other and being driven from said second transverse shaft in opposite directions, the shafts of said second series being at substantially right angles to the shafts of said first series, and spur rollers mounted on the shafts of said series at their point of convergence.

JOHN M. C. JONES.

Witnesses:
JAMES KEWLEY,
IRA W. FURBY.